United States Patent [19]

Gerlach et al.

[11] Patent Number: 5,047,784
[45] Date of Patent: Sep. 10, 1991

[54] ZERO CROSS-CORRELATION COMPLEMENTARY RADAR WAVEFORM SIGNAL PROCESSOR FOR AMBIGUOUS RANGE RADARS

[75] Inventors: Karl R. Gerlach, Dunkirk, Md.; Frank F. Kretschmer, Jr., Sarasota, Fla.

[73] Assignee: The United States of America as represented by the Secretary of the Navy, Washington, D.C.

[21] Appl. No.: 647,946

[22] Filed: Jan. 30, 1991

[51] Int. Cl.$^5$ ............................................. G01S 13/30
[52] U.S. Cl. .................................. 342/201; 342/204; 342/145; 342/132; 342/134
[58] Field of Search ................ 342/145, 134, 201, 132, 342/202, 204

[56] References Cited

U.S. PATENT DOCUMENTS

H767  4/1990  Kretschmer, Jr. et al. ........ 342/145

OTHER PUBLICATIONS

Karl Gerlack and F. F. Kretschmer, Jr., General Forms and Properties of Zero Cross-Correlation Radar Waveforms, Naval Research Laboratory, Washington, D.C., NRL Report 9120, Jan. 30, 1990.

Primary Examiner—John B. Sotomayor
Attorney, Agent, or Firm—Thomas E. McDonnell; Edward F. Miles

[57] ABSTRACT

A method and apparatus exploiting the discovery that the crosscorrelation of constantly spaced rows of the matrices representing certain pulse codes sum to zero. In a ranging system, such as a radar, pulses are coded according to the rows of a such a matrix, transmitted sequentially and each return processed sequentially through a filter matched to one of the coded pulses. (A different preselected filter is used for each return.) The sequence of filters is chosen so that for returns for a given range interval, each filter is matched to the returning pulse, resulting in outputs from the filters representing auto-correlations of the returned pulses. These outputs are time delayed added coherently to form the compressed pulse, and annunciated as a target hit. Should the filters and returns be mismatched, as with ambiguous stationary clutter returns, the outputs of the filters are cross-correlations which, according to said discovery, sum to zero. Thus the invention operates to remove ambiguous range clutter from returns in such a ranging system.

2 Claims, 3 Drawing Sheets $$\begin{bmatrix} F_0 \\ F_1 \\ F_2 \\ F_3 \end{bmatrix} = \begin{bmatrix} 1 & 1 & 1 & 1 \\ 1 & j & -1 & -j \\ 1 & -1 & 1 & -1 \\ 1 & -j & -1 & j \end{bmatrix}$$

FIG. 1a $$\underline{F} = \begin{bmatrix} \underline{F_0} \\ \underline{F_1} \\ \vdots \\ \underline{F_{(N-1)}} \end{bmatrix} = \begin{bmatrix} d_0\lambda^0 W_N^{(0)(0)M} & d_1\lambda^0 W_N^{(1)(0)M} & \cdots & d_{N-1}\lambda^0 W_N^{(N-1)(0)M} \\ d_0\lambda^1 W_N^{(0)(1)M} & d_1\lambda^1 W_N^{(1)(1)M} & \cdots & d_{N-1}\lambda^1 W_N^{(N-1)(1)M} \\ \vdots & \vdots & \cdots & \vdots \\ d_0\lambda^{(N-1)} W_N^{(0)(N-1)M} & d_1\lambda^{(N-1)} W_N^{(1)(N-1)M} & \cdots & d_{N-1}\lambda^{(N-1)} W_N^{(N-1)(N-1)M} \end{bmatrix}$$

FIG. 1b

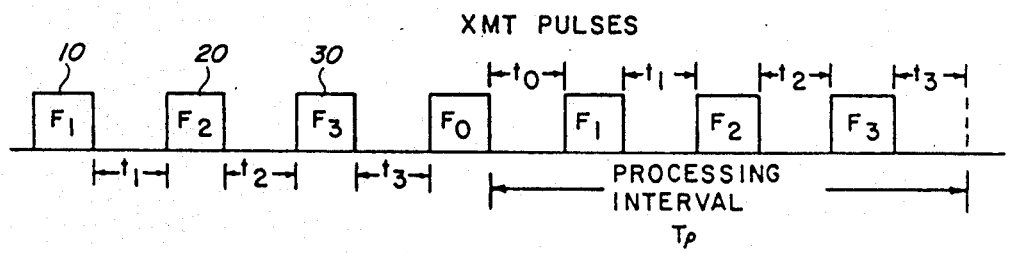

FIG. 2

|  | FILTERS MATCH TO | | | |
|---|---|---|---|---|
| CHANNEL | $t_0$ | $t_1$ | $t_2$ | $t_3$ |
| 0 | $F_0$ | $F_1$ | $F_2$ | $F_3$ |
| 1 | $F_3$ | $F_0$ | $F_1$ | $F_2$ |
| 2 | $F_2$ | $F_3$ | $F_0$ | $F_1$ |
| 3 | $F_1$ | $F_2$ | $F_3$ | $F_0$ |

FIG. 5

ZERO CROSS-CORRELATION COMPLEMENTARY RADAR WAVEFORM SIGNAL PROCESSOR FOR AMBIGUOUS RANGE RADARS

BACKGROUND OF THE INVENTION

In simplest form, a radar system consists of the generation of a pulse having a certain duration, followed by a listening period in which returns are received. A radar designer usually wishes to increase the power of target returns to provide better detection. The most straightforward way to do this is to increase pulse amplitude. Unfortunately, useful radars require pulse amplitudes that would result in waveguide arcing and electrical breakdown. A conventional way to circumvent this problem is to use pulse compression techniques, i.e. transmitting a series of low amplitude pulses (subpulses) of the same aggregate energy as a higher amplitude pulse. The pulses are typically modulated (the modulated pulse also called a coded waveform) and transmitted. Returns are processed through a matched filter (i.e. a filter whose transfer function optimizes the signal to noise ratio), resulting in a signal that is a compressed pulse that is also the auto-correlation of the coded waveform in the absence of doppler shifts. Pulse coding can be expressed in matrix form, examples of which are matrices for the well-known Frank and P4 codes. The matrix describes the phase shifting necessary to phase modulate the subpulses of a coded pulse. Such a matrix is a square one of dimension NxN, each element of which represents a phase shift (the phase modulation) of one subpulse. The Frank or P4 code consists of concatenated $N^2$ subpulses having the phases described by the elements of the consecutive rows of the matrix, reading from left to right. An example of a Frank matrix is shown in FIG. 1 for N=4. The elements of, e.g., the second row, 1, j, −1, −j, describe the fifth to eighth subpulses with respective phase modulation of 1 (i.e. 0°), j (i.e. 90°), −1 (i.e. 180°), and −j (i.e. −90°).

Such a radar system commonly operates by generating a sequence of identically coded waveforms, separated in time by detection, or listening intervals, in which the radar can detect returns of the transmitted waveform. The range for which the radar can receive unambiguously is limited to the distance a pulse can travel to and from the radar during its detection interval. This distance is called the unambiguous range. Often, downrange from the unambiguous range is clutter (e.g. hills) which can reflect radar returns, and such clutter can cause pulses to return to the radar during detection intervals for later pulses (i.e. be "folded over" into a later detection interval). Clutter causing foldover into the next pulse's detection interval is said to be located in the first ambiguous range, foldover into the second succeeding detection interval is said to be from the second ambiguous range, etc. Unambiguous range clutter is undesirable because it increases the cancellation requirements of the radar and the dwell time required to process clutter returns, and because it causes the range to be ambiguous in mapping applications.

In Statutory Invention Registration (SIR) H767, the inventors disclosed a method and apparatus for eliminating ambiguous range clutter. The invention of SIR H767 derives from a discovery by the inventors of properties of the Frank and P4 matrices, in particular that the sum of cross-correlations between rows of a Frank or P4 matrix, spaced by a constant number of rows, is zero. More generally, for such a matrix of dimension NxN, if the cross-correlations between rows q and m of the matrix are given by $C_{qm}(i)$, for $i = \pm 0, \pm 1, \pm 2, \ldots, \pm(N-1)$:

$$\Sigma_{q=1} C_{qm}(i) = 0, i = \pm 1, \pm 2, \ldots, \pm N - 1$$

where $m = (q+r)$ mod N, $r = 1, 2, \ldots, (N-1)$.

The invention of SIR H767 is a method and apparatus for transmitting and processing a sequence of coded pulses $F_1, F_2, \ldots, F_{N-1}, F_0, F_1, \ldots, F_{N-1}$, each of the coded pulses $F_n$, $n=0, 1, 2, \ldots, N-1$, being coded in accordance with the $(n+1)$th row of a Frank or P4 matrix of dimension NxN. Each of the coded pulses are spaced from adjacent ones of the coded pulses by time intervals $t_0, t_1, \ldots, t_{n-1}$, each $F_n$ being followed immediately by a corresponding $t_n$, the last N of said time intervals being denominated detection intervals. An integer c is selected from the set whose members are: 0, 1, 2, ..., N−1. Returns of the coded pulses during each of the detection intervals are detected. The returns detected in each detection interval are passed through a corresponding filter matched to one of the coded pulses $F_n$, $n = (N+j-c)$ mod N, where $j = 0, 1, 2, \ldots, N-1$. The outputs of the filters generated during all N detection intervals are coherently summed.

The importance of this scheme derives from the inventors' discovery that the cross-correlations of rows of Frank or P4 matrices spaced equally apart sum to zero. In most simple form, such a system is designed to generate a series of pulses $F_0, F_1, F_2, \ldots, F_{n-1}$. After each pulse the system processes returns using a filter matched to the pulse, changing the filter with each detection interval. Thus over all the detection intervals the system employs a sequence of filters matched to the various pulses $F_n$, and employs them in the same order as the pulses to which they are matched. Each value of c shifts the filter sequence in a circular manner, and clutter time shifts the returns an amount determined by the particular ambiguous range in which the clutter is situated. If these shifts are identical, each returning pulse in each interval is matched to the filter employed, and the detected signal in each interval is the auto-correlation of the filter's transfer function. The coherent sum of these auto-correlations over the detection intervals yields the compressed pulse. If the shifts are not identical, the detected output in each interval is the cross-correlation of the pulse and the transfer function of the filter. Because the pulses are coded sequentially according to rows of a Frank or P4 matrix, and because the filters are not matched to these pulses in this sequence, the coherent sum of these over the detection intervals constitute the sum of cross-correlations between rows of the coding matrix spaced a constant amount apart. The inventors' discovery about Frank or P4 matrices demonstrates that this sum is zero.

Thus by choice of c a system according to the invention can "tune" itself to detect returns from the unambiguous range, or any of the ambiguous ranges, and reject all other returns. One could also have a plurality of these systems, each tuned to one range, and thus detect all returns and simultaneously determine from which range each return has come.

However, the invention disclosed in SIR H767 is limited to use with a Frank or P4 code. This limits the freedom an engineer has in designing radar systems which have the advantages of that invention. Also, with the Frank or P4 code even small doppler shifts from ambiguous range echoes can be detected, causing false alarms.

SUMMARY OF THE INVENTION

Accordingly, an object of the present invention is to be able to reduce or eliminate ambiguous range clutter in radar systems which use a much broader range of pulse codes than just the Frank or P4 codes, so as to give the design engineer greater flexibility in designing such radars.

Because the ability to distinguish clutter from non-clutter implies also the ability to map the clutter, another object is to identify the existence of non-ambiguous range clutter so as to facilitate existing techniques to map clutter.

In accordance with these and other objects made apparent hereinafter, the invention is a method and apparatus for ranging like that of SIR H767, except that the pulses are coded in accordance with the (n+1)th row of the NxN matrix $\underline{F}$, having rows $F_0, F_1, \ldots, F_{(N-1)}$, where the elements of $\underline{F}$ are given by:

$$\begin{bmatrix} d_0\lambda^0 W_N^{(0)(0)M} & d_1\lambda^0 W_N^{(1)(0)M} & \cdots \\ d_0\lambda^1 W_N^{(0)(1)M} & d_1\lambda^1 W_N^{(1)(1)M} & \cdots \\ \vdots & \vdots & \\ d_0\lambda^{(N-1)} W_N^{(0)(N-1)M} & d_1\lambda^{(N-1)} W_N^{(1)(N-1)M} & \cdots \end{bmatrix}$$

$$\cdots \begin{matrix} d_{N-1}\lambda^0 W_N^{(N-1)(0)M} \\ d_{N-1}\lambda^0 W_N^{(N-1)(1)M} \\ \vdots \\ d_{N-1}\lambda^0 W_N^{(N-1)(N-1)M} \end{matrix} \Bigg] = \begin{bmatrix} \underline{F_0} \\ \underline{F_1} \\ \vdots \\ \underline{F_{(N-1)}} \end{bmatrix} = \underline{\underline{F}}$$

and where:
$n = 0, 1, 2, \ldots, (N-1)$,
$d_n$ is an arbitrarily chosen complex number of unit magnitude for all n,
$\lambda$ is chosen from the set whose members are $\{W_N^n\}$,
$W_N = \exp(j2\pi/N)$, and
M is an integer relatively prime to N.

The inventors have discovered that, like the Frank or P4 codes, the sum of the cross-correlation functions between equally spaced rows of the matrix F is zero, i.e.:

$$\Sigma_{n=0} C(\underline{F}_{n+1}, \underline{F}_{n+1+m}) = 0, m \neq 0$$

Where C indicates the correlation function. This is the same property which permitted the clutter reduction in SIR H767. However, $\underline{\underline{F}}$ above comprehends a much broader class of codes than merely the Frank and P4 codes. (For example, for $d_n = 1$ for all n, $\lambda = 1$, and $M = 1$, $\underline{\underline{F}}$ reduces to the Frank code.) Because one has a relatively wide range of choices in selecting the values for $\lambda$ and the $d_n$'s, the radar engineer has greater flexibility in systems design. Variations in the phase codings imposed on coded pulses can vary such system characteristics as sidelobe magnitude, and sensitivity to doppler shifting of echoes. Because $\lambda$ and the $d_n$'s are N+1 system variables which can vary independently of one another, the invention gives the engineer designing a radar system N+1 degrees of freedom in selecting a set of codings which will also secure for the system the advantages disclosed in SIR H767. The engineer can use the N+1 degrees of freedom to select (e.g. iteratively) a set of codings for any particular application which will optimize desired system characteristics, such as sidelobe magnitude or sensitivity to doppler. (See, K. Gerlach et al., "General Forms and Properties of Zero Cross-Correlation Radar Waveforms," NRL Report 9120 (Jan. 30, 1990), the text of which is incorporated herein by reference.

The invention is more fully understood from the following detailed description of a preferred embodiment, it being understood, however, that the invention is capable of extended application beyond the precise details of the preferred embodiment. Changes and modifications can be made that do not affect the spirit of the invention, nor exceed its scope, as expressed in the appended claims. Accordingly, the invention is described with particular reference to the accompanying drawings, wherein:

BRIEF DESCRIPTION OF THE DRAWINGS

FIG. 1a is an example of a Frank matrix of dimension 4x4.

FIG. 1b is the code used in the invention, presented in the form of matrix F.

FIG. 2 is a schematic representation of the coded pulses used in a four channel embodiment of the invention.

FIG. 5 is a table listing the sequence of matched filters used in the invention.

DETAILED DESCRIPTION

Figure 3:
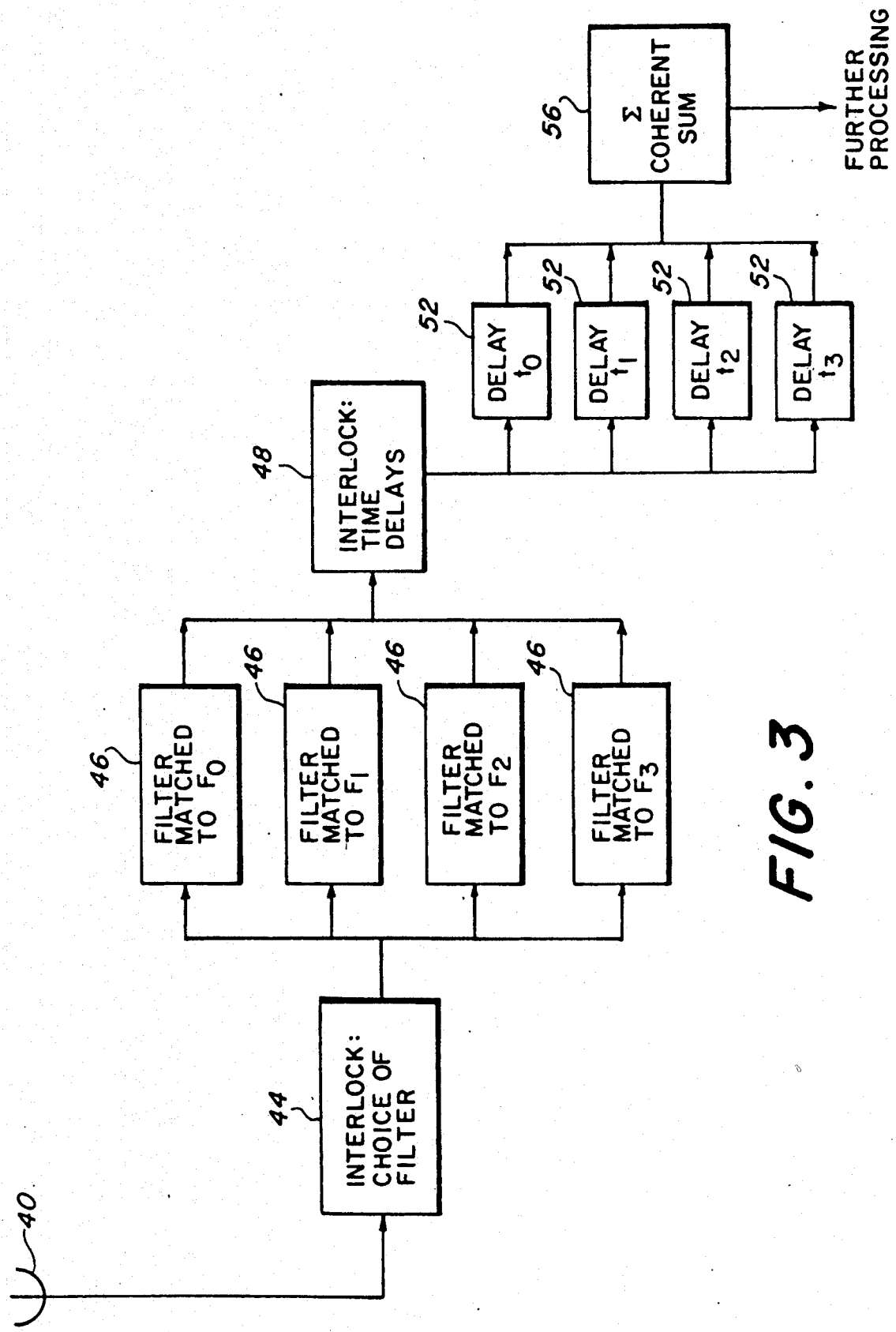
FIG. 3 is a schematic diagram of a processing system used with the invention.
Figure 4:
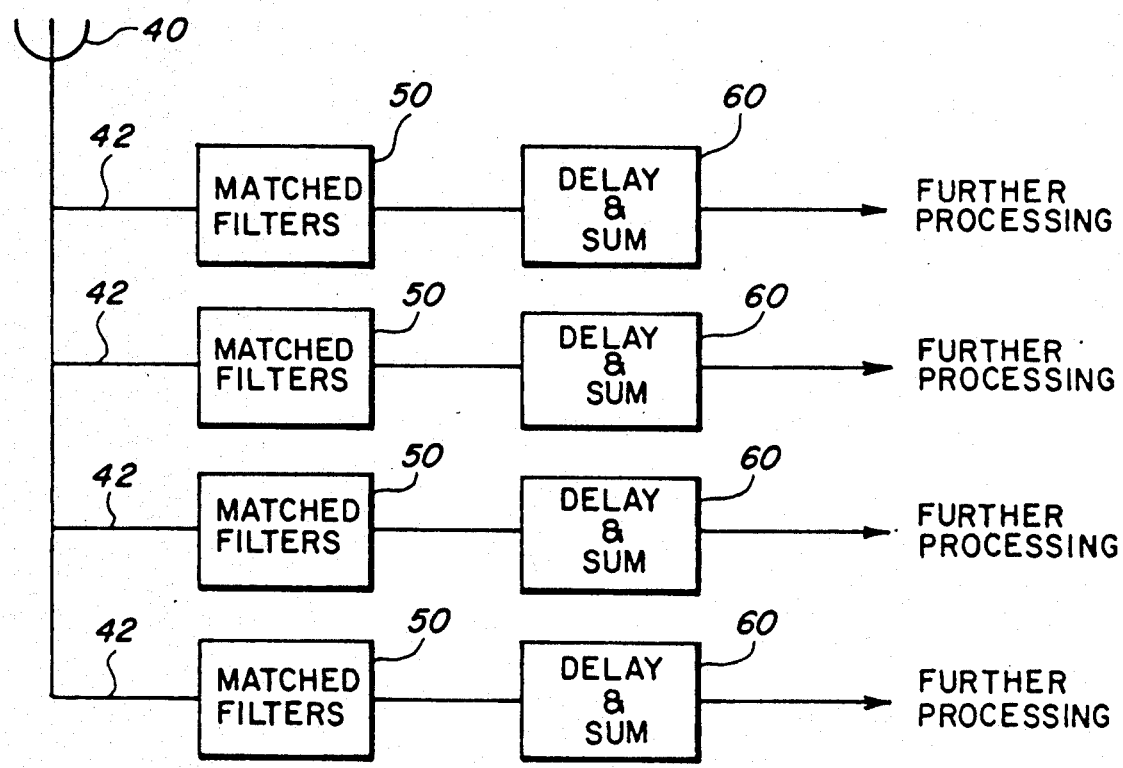
FIG. 4 is a schematic diagram of an alternative processing system according to the invention.

With reference to the drawing figures, like numbers indicating like parts throughout the several views, and with particular reference to FIG. 2, this figure shows schematically a radar waveforms using four coded pulses $F_0, F_1, F_2, F_3$. These coded pulses could be those corresponding respectively to the rows of the matrix of FIG. 1b for N=4 (i.e., a 4×4 matrix). (The choice of N=4 is arbitrary, and is done here for clarity of explanation.) After each coded pulse $F_n$ is transmitted, the system "listens" for a period $t_n$ for returns of $F_n$. If target range is chosen properly, and no ambiguous range clutter is present, a return of $F_0$ should occur in $t_0$, a return of $F_1$ in $t_1$, etc. These returns are time delayed and coherently added by conventional circuitry. (Cf. FIGS. 3 and 4.)

The presence of ambiguous range clutter can cause "folding over" of returns of one coded pulse $F_n$ into the wrong detection interval $t_m$, m=n, resulting in spurious range returns. For example, a clutter return from the second ambiguous range would cause a coded pulse $F_0$ to arrive within $t_2$, $F_1$ to arrive in $t_3$, etc.

This is countered by first adding additional coded pulses $F_1, F_2, F_3$ (or, more generally, $F_1, F_2, \ldots, F_{N-1}$). These additional pulses are indicated, respectively as members 10, 20, 30 in FIG. 2. Additional pulses 10, 20, 30 ensure that, if there is folding over, each detection interval $t_n$ will have a coded pulse folded into it. For example, even with folding over, over all four detection intervals (more generally N detection intervals) a complete set of all four (more generally N) coded pulses will return. This is necessary for application of the inventors' discovery about the class of codes shown in FIG. 1b.

FIG. 3 shows schematically a system according to the invention. Antenna 40 receives a return which is passed by interlock 44 to a filter 46. Interlock 44 has conventional electronics (not shown) to steer the return to a preselected one of filters 46 during each detection interval. The filtered return passes to a second interlock 48 which contains conventional circuitry (not shown) to select an appropriate time delay 52 to permit coherent summing of the return by summer 56 over a complete set of detection intervals. In operation, interlock 44 sequences the choice of filters 46 to "tune" the system to a particular ambiguous (or the unambiguous) range as above described.

FIG. 4 shows an alternative arrangement having a plurality of legs 42, each constituted by a system as shown in FIG. 3. In particular, each leg 42 has a bank of matched filters 42 (corresponding to members 44 and 46 of FIG. 3), and delay and sum processors 60 (corresponding to members 48, 53, and 56 of FIG. 3). In this arrangement, the sequence of individual filters 46 in banks 50 is done to "tune" each leg 42 to a particular one of the first three ambiguous ranges, and the unambiguous range, respectively. In this way, all returns from these ranges can be detected simultaneously, and, depending on which leg detects the return, can identify the range of origin.

The invention has been described in what is considered to be the most practical and preferred embodiments. It is recognized, however, that obvious modifications may occur to those with skill in this art. Accordingly, the scope of the invention is to be discerned solely by reference to the appended claims, wherein:

We claim:

1. A method of ranging comprising steps for:
transmitting a sequence of coded pulses $F_1, F_2, \ldots, F_{(N-1)}, F_0, F_1, \ldots, F_{N-1}$, each of said coded pulses $F_n, n=0, 1, 2, \ldots, N-1$, being coded in accordance with the $(n+1)$th row of a matrix of dimension NxN given as follows:

$$\begin{bmatrix} d_0\lambda^0 W_N^{(0)(0)M} & d_1\lambda^0 W_N^{(1)(0)M} & \ldots \\ d_0\lambda^1 W_N^{(0)(1)M} & d_1\lambda^1 W_N^{(1)(1)M} & \ldots \\ \vdots & & \ldots \\ \vdots & & \ldots \\ d_0\lambda^{(N-1)} W_N^{(0)(N-1)M} & d_1\lambda^{(N-1)} W_N^{(1)(N-1)M} & \ldots \end{bmatrix}$$

$$\begin{bmatrix} d_{N-1}\lambda^0 W_N^{(N-1)(0)M} \\ d_{N-1}\lambda^0 W_N^{(N-1)(1)M} \\ \vdots \\ d_{N-1}\lambda^0 W_N^{(N-1)(N-1)M} \end{bmatrix}$$

each of said coded pulses being spaced from adjacent ones of said coded pulses by time intervals $t_0, t_1, \ldots, t_{N-1}$, each $F_n$ being followed immediately by a corresponding $t_n$, the last N of said time intervals being denominated detection intervals;
selecting an integer c from the set whose members are: $0, 1, 2, \ldots, N-1$;
detecting returns of said coded pulses during each of said detection intervals;
passing said returns detected in each said detection interval through a corresponding filter matched to one of said coded pulses $F_n$, $n=(N+j-c) \bmod N$, $j=0, 1, 2, \ldots, N-1$;
coherently summing the outputs of said filters generated during said detection intervals.

2. An apparatus for ranging, said apparatus comprising:
means for transmitting a sequence of coded pulses $F_1, F_2, \ldots, F_{(N-1)}, F_0, \ldots, F_{n-1}$, each of said coded pulses $F_n, n=0, 1, 2, \ldots, N-1$, being coded in accordance with the $(n+1)$th row of a matrix of dimension NxN given as follows:

$$\begin{bmatrix} d_0\lambda^0 W_N^{(0)(0)M} & d_1\lambda^0 W_N^{(1)(0)M} & \ldots \\ d_0\lambda^1 W_N^{(0)(1)M} & d_1\lambda^1 W_N^{(1)(1)M} & \ldots \\ \vdots & & \ldots \\ \vdots & & \ldots \\ d_0\lambda^{(N-1)} W_N^{(0)(N-1)M} & d_1\lambda^{(N-1)} W_N^{(1)(N-1)M} & \ldots \end{bmatrix}$$

$$\begin{bmatrix} d_{N-1}\lambda^0 W_N^{(N-1)(0)M} \\ d_{N-1}\lambda^0 W_N^{(N-1)(1)M} \\ \vdots \\ d_{N-1}\lambda^0 W_N^{(N-1)(N-1)M} \end{bmatrix}$$

said means for transmitting being effective to cause each of said coded pulses to be spaced from adjacent ones of said coded pulses by time intervals $t_0, t_1, \ldots, t_{n-1}$, each $F_n$ being followed immediately by a corresponding $t_n$, the last N of said time intervals being denominated detection intervals;
means for selecting an integer c from the set whose members are: $0, 1, 2, \ldots, N-1$;
means for detecting returns of said coded pulses during each of said detection intervals;
means for passing said returns detected in each said detection interval through a corresponding filter matched to one of said coded pulses $F_n$, $n=(N+j-c) \bmod N$, $j=0, 1, 2, \ldots, N-1$;
means for coherently summing the outputs of said filters generated during said detection intervals.

* * * * *